United States Patent
Addonisio et al.

(10) Patent No.: US 7,277,889 B2
(45) Date of Patent: Oct. 2, 2007

(54) ASSET MANAGEMENT AND STATUS SYSTEM

(76) Inventors: Louis Salvatore Addonisio, 200 Maple St., Medford, NY (US) 11763; George Smagala, 1002 Grand Blvd., Westbury, NY (US) 11590

( * ) Notice: Subject to any disclaimer, the term of this patent is extended or adjusted under 35 U.S.C. 154(b) by 504 days.

(21) Appl. No.: 10/680,484

(22) Filed: Oct. 7, 2003

(65) Prior Publication Data

US 2005/0076034 A1  Apr. 7, 2005

(51) Int. Cl.
*G06F 17/30* (2006.01)
(52) U.S. Cl. ......................................... 707/10; 707/203
(58) Field of Classification Search ............. 707/1–10, 707/100–104.1, 200–205; 340/572.1
See application file for complete search history.

(56) References Cited

U.S. PATENT DOCUMENTS

| | | | |
|---|---|---|---|
| 5,420,579 A | | 5/1995 | Urbas et al. |
| 5,936,527 A | * | 8/1999 | Isaacman et al. ........ 340/572.1 |
| 5,986,569 A | | 11/1999 | Mish et al. |
| 6,354,493 B1 | | 3/2002 | Mon |
| 6,456,039 B1 | | 9/2002 | Lauper et al. |
| 6,525,648 B1 | * | 2/2003 | Kubler et al. ............. 340/10.33 |
| 6,878,052 B2 | * | 4/2005 | Andersson ................... 452/149 |
| 6,998,965 B1 | * | 2/2006 | Luciano, Jr. et al. ... 340/323 R |
| 2002/0011932 A1 | * | 1/2002 | Rodgers et al. .......... 340/572.1 |
| 2002/0038267 A1 | * | 3/2002 | Can et al. ..................... 705/28 |
| 2002/0044058 A1 | * | 4/2002 | Heinrich et al. ......... 340/572.1 |
| 2002/0089434 A1 | * | 7/2002 | Ghazarian ................... 340/988 |
| 2003/0104848 A1 | | 6/2003 | Brideglall |
| 2003/0107515 A1 | | 6/2003 | Howard |

OTHER PUBLICATIONS

K.V.S Rao, "An Overview of Back Scattered Radio Frequency Identification System (RFID)", Feb. 1999, IEEE, pp. 746-749.*

* cited by examiner

*Primary Examiner*—Mohammad Ali
(74) *Attorney, Agent, or Firm*—Island Patent; F. Scott Tierno

(57) ABSTRACT

An asset management and status system includes a number of data communication terminals and one or more interconnected remote computing systems, which may be utilized for managing and tracking a large number of varied and distributed assets. Each data communication terminal is arranged to interrogate a proximate electronic device of an asset to determine an identifying code, and further activate an included position determining module to determine a current location. Subsequently, the identifying code and current location information are transmitted to the remote computing system for use in updating a database established and maintained on the remote computing system.

16 Claims, 7 Drawing Sheets

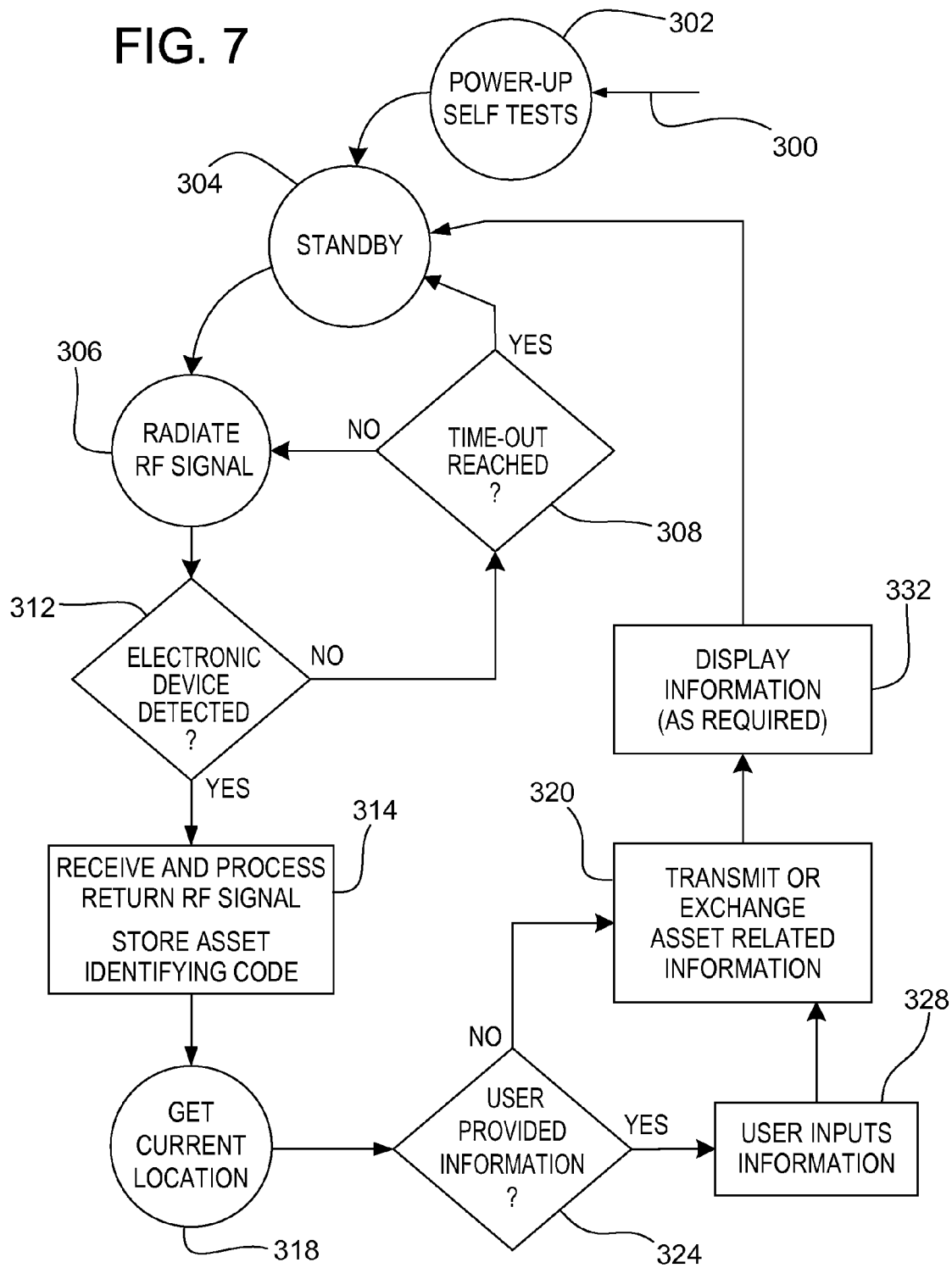

ASSET MANAGEMENT AND STATUS SYSTEM

CROSS REFERENCE TO RELATED APPLICATIONS

The subject matter provided herein is related to application Ser. No. 10/680,487 filed on Oct. 7, 2003, which is hereby incorporated by reference.

TECHNICAL FIELD

The present invention relates most generally to asset management, tracking, and database systems. More particularly, the invention relates to an asset management system and method of operation enabling a large number of varied and distributed assets to be managed and tracked, such that a database is established, updated and generally maintained for providing status and other information regarding the plurality of assets.

BACKGROUND

A variety of asset management systems are well known in the art. Often, assets are tagged with an identifying number or code. For example, a very common identification means is provided by employing barcode labels. The asset identifying code is then available for input into a system, as required, for a variety of uses or functions. In many such systems the respective terminal into which the asset's code is input (e.g., scanned or read) typically has a known or fixed location identifier. For example, when a respective terminal is installed it may be assigned an alphanumeric code, or the location information may simply be input into the terminal where it is stored in a memory structure for future recalling. Should the terminal later need to be moved any significant distance, the location information must be updated in order to continue to provide accurate location reporting.

If the terminals that are employed to receive an identifying code of an asset, as well as other information, are small and or portable in structure, and used by personnel over a significant area (such as a large factory complex) or over a geographic region (such as a county or state), providing accurate location information can be problematic. In such situations, to maintain accuracy in reporting the location of assets, it may indeed be necessary for a user to repeatedly, and manually, input a current location.

When considering the need to inventory, track, and or maintain status, location, and possibly other information for a plurality of distributed assets, which are to be managed and inventoried for an extended period of service (say months or years) and possibly over a large area/region, the task is even more difficult to accomplish accurately.

In demanding inventory control and management situations, wherein human error is to be minimized or eliminated, there is a need for an easy to use system and method of operation wherein individuals can quickly and accurately identify the respective asset, and subsequently, in an automated fashion determine a current location of the asset. Once this information is available, as well as other information that may be determined and or included, it would be most desirable to be able to collect such information in a specified location or locations wherein interested and authorized individuals can access the information, as required.

Accordingly, there is a need for an asset management and status system enabling a plurality of assets to be tracked, managed, and efficiently monitored. Preferably such a system would be easy to use, and include an accessible database of asset information, which is established, updated, and available for interested and or authorized individuals to employ, as necessary for tracking, managing, determining the status of, and or deploying a plurality of distributed assets. Additionally, it would be most desirable to have a preferably portable data communication terminal which is structured for determining the identifying code of the asset, a current location, etc., and making this information available for updating one or more records of the database.

A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF PREFERRED EMBODIMENTS

In accordance with the present invention, a distributed asset management and status system enables a plurality of distributed assets to be inventoried, managed, deployed, and or tracked. Each asset of interest has suitably fixed thereto an electronic device. Preferable electronic devices, which may also be termed 'electronic identification devices', are wirelessly accessible (i.e., via reading or interrogating) using an RF signal. When read, the electronic device provides a unique identifying code that has been assigned to the asset to which the electronic device is fixed. The identifying code may then be used for accessing one or more records of the database, as needed.

The asset management and status system most preferably includes a remote computing system upon which a database is established, maintained and updated. This database may be centrally located and provided by one or more computers located at a single location. Alternately, the remote computing system may be provided by a plurality of distributed or clustered computing systems that are interconnected, say by way of data and communication networks. Importantly, the database provides an asset information repository preferably containing at least one record of information for each asset being managed. Each of the asset records is available for accessing, either locally at a site of a remote computing system, or remotely therefrom, each time an asset is identified.

Another aspect of the asset management and status system of the invention is the inclusion of a plurality of data communication terminals. Each data communication terminal is arranged with a multi-function communications capability provided by a plurality of communication modules. For example the plurality of communication modules may include a position determining module/receiver, a local wireless reader or transceiver, and a wireless communication module. The communication modules of the data communication terminal are included for:

i) establishing a communication link with at least one proximate electronic device of an asset for exchanging information therewith, including a receiving by the data
} communication terminal of information including a unique identifying code transmitted by a respective proximate electronic device;

ii) receiving and processing position information enabling a determining of a current location at which the asset and data communication terminal are located; and iii) transmitting information, including at least the identifying code and the associated current location information to the remote computing system.

The transmitted asset information, including the identifying code and current location, may then be used to access and update one or more records of the database established and maintained upon the remote computing system.

Accordingly, the structure and configuration of the preferred embodiments of the present invention, which include data communication terminals, electronic devices (fixed to assets of interest), a remote computing system, and all necessary communications infrastructure, may be arranged to operate in a number of differing ways. For example, a first method of operation may include the steps of:

a) employing a data communication terminal for electronically reading (e.g., interrogating) a proximate electronic device of an asset in order to determine a unique identifying code;

b) receiving information from the electronic device, with the information including at least an identifying code;

c) determining a current location by employing the position determining module for receiving and possibly processing position information; and d) transmitting information including the identifying code and the current location to the remote computing system;

e) accessing and updating at least one record of the database of asset related information.

The above method may be modified in a number of manners. First, upon receiving the identifying code and current location information, a data communication terminal structured with a user interface may enable a user to input asset related information. This may include the condition of the asset, where the asset is to be sent next, how long it may take to repair or calibrate the asset, etc. In addition, once information has been sent from the data communication terminal to the remote computing system, any of the following actions may occur:

a) portions of one or more records of asset information may be updated or altered (e.g., current location may be updated); and b) portions of one or more records may be transmitted back to the data communication terminal from which the identifying code was originally transmitted, possibly for user viewing via the user interface.

As appreciated by skilled persons, a large number of operational variations may be provided by embodiments of the present invention. Accordingly, the examples provided herein are not intended to be limiting, with the breadth of the present invention determined by the scope of the included claims.

In the most preferred embodiments of the invention it is desirable to employ electronic devices that do not require line-of-sight reading/accessing. For example, preferred embodiments of the electronic device of the invention would certainly include passive RFID tags, active RFID transponders, and or a variety of portable computing and communication devices. The latter computing and communication devices may include personal voice communication devices/systems, wearable computers, control devices, etc.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 7 illustrates a high level operational flow diagram, in a simplified form, for an embodiment of a data communication terminal in accordance with the invention.

Figure 1:
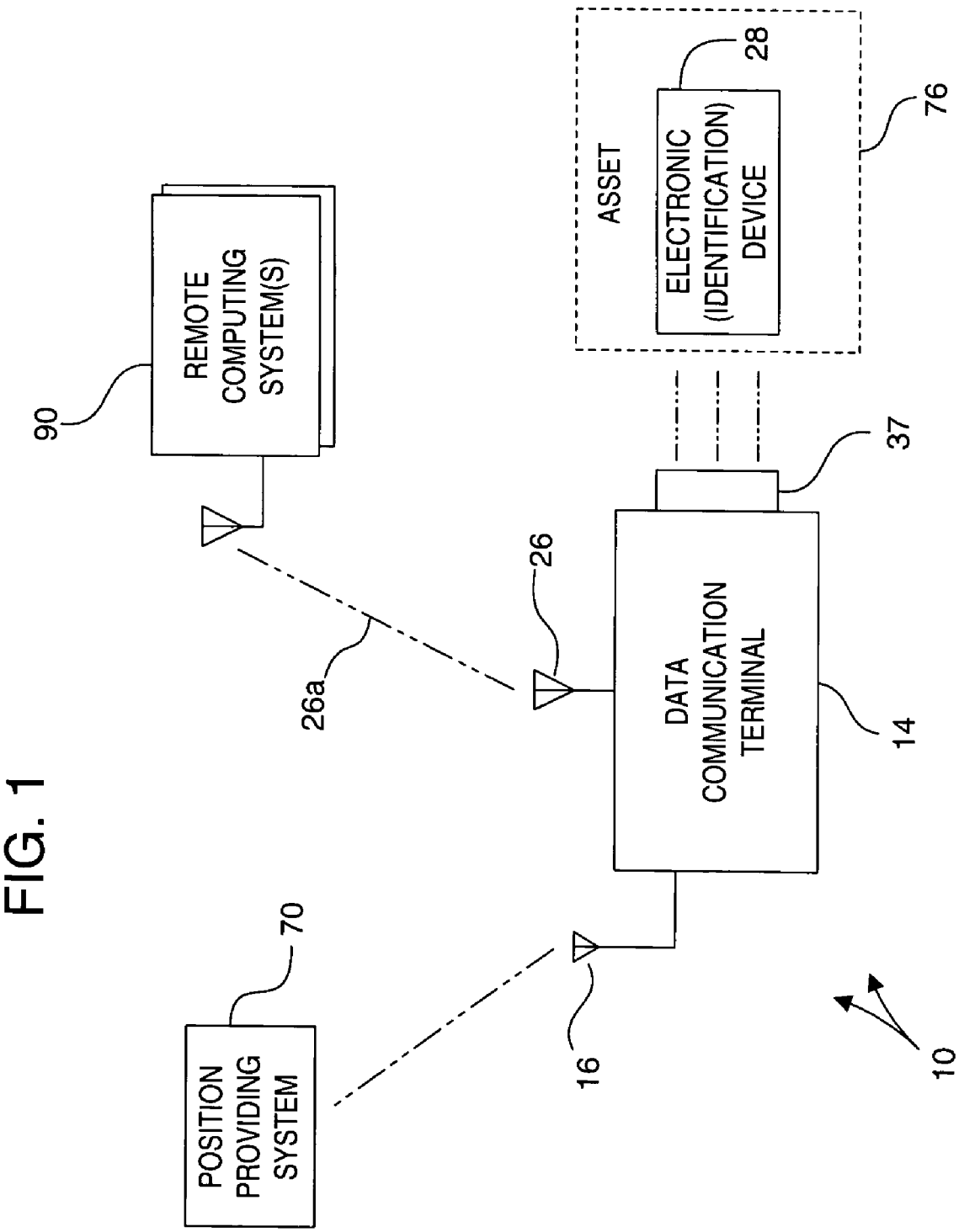
FIG. 1 depicts a high level block diagram of a broadly defined asset management and status system in accordance with the present invention.

| Partial List Of Reference Numerals | |
|---|---|
| 10 | asset management and status system |
| 14 | data communication terminal |
| 14a | hand-holdable data communication terminal |
| 16 | position determining (GPS) antenna |
| 18 | control or controller module |
| 20 | GPS Module |
| 22a | GPS Receiver |
| 22b | interface circuits of 20 |
| 24 | system bus |
| 26 | wireless communication antenna |
| 26a | (first) communication link |
| 26b | (second) communication link |
| 28 | electronic (identification) device |
| 28a | RFID tag |
| 30 | wireless communication module |
| 32a | transceiver |
| 32b | interface circuits of 30 |
| 36 | RFID interrogator antenna |
| 37 | interrogator head portion |
| 38a | RF Reader |
| 38b | RF Transmitter |
| 38c | interface for 40 |
| 40 | RFID interrogator or transceiver module |
| 50 | user interface |
| 52 | display unit |
| 54 | keypad or keyswitches |
| 56 | annunciators |
| 58 | battery |
| 60 | external power source |
| 62 | regulator and charging circuit |
| 64 | power outputs of 62 |
| 70 | position providing system |
| 70a | global positioning system (GPS)/Satellites |
| 76 | asset |
| 80 | wireless communications infrastructure |
| 90 | remote computing system |
| 94 | (asset) database |

DETAILED DESCRIPTION OF EMBODIMENTS OF THE INVENTION

It is important to establish the definition of a number of descriptive terms and expressions that will be used throughout this disclosure. The term 'asset' is to be defined as any item that can be inventoried and managed in accordance with the invention. As such, and as indicated in the context of this disclosure, the term asset is to be broadly defined and may include equipment, components, vehicles, weapons, ordinance, personnel, livestock, animals, and or many other suitable items. The terms 'proximate', 'closely positioned', 'nearb', and 'short distance' may most often be defined with respect to any of: a respective embodiment of the invention, the actual electronic device fixed to an asset, how the electronic device is fixed to the asset, the power level of an RF reader or interrogator employed with the invention, as well as other considerations. For example, if the electronic device is a passive RFID tag, proximate may be defined as substantially within a range of 0 to 5 centimeters. However, if the electronic device is provided by an active RFID transponder or a portable computing and communication device, the term proximate may be extended considerably. Typical active RFID devices may be read or interrogated over a range of centimeters to meters, or more. Accordingly, it should be understood, that the terms 'proximate', and equivalents thereto, may actually be best defined by the embodiment with which such a term is employed, and the relative scales utilized therewith. The terms 'coupled', 'coupled to', etc., are to be understood to mean that two items are either directly electrically connected or alternately electrically or operatively connected to each other via one or more additional (possibly implied) structures or components. Other important terms and definitions will be provided, as they are needed, to properly define the present invention and its associated novel characteristics and features.

Referring now to the drawings, FIG. 1 provides a high level functional block diagram of a broadly defined asset management and status system 10 in accordance with the present invention. As can be seen therein, an asset management and status system 10 includes a data communication terminal 14 and a remote computing system 90. A wireless communication antenna 26 of the data communication terminal 14 is available for establishing a communication link 26a with the remote computing system 90 whenever there is a need to exchange information, including asset related information. Each data communication terminal 14 is further equipped with an interrogator head portion 37, or an equivalent means, available for detecting an electronic device 28, which is fixed to and or associated with an asset 76 of interest. The interrogator head portion 37 and associated modules of the data communication terminal 14 are employed for ascertaining an identifying code from the asset's electronic device 28. In preferred embodiments of the invention, the identifying code is read or received via a communication link, with or without a line-of-sight view between a reader and a respective electronic device. For example, the electronic device 28 may most preferably be provided by a passive RFID device, an active RFID device, and or a suitably structured highly portable computing and communication device. Regardless of the actual embodiment of the electronic device employed, the electronic device must respond to a received RF signal by providing information, including the identifying code of the asset 76.

As understood by skilled persons, a plurality of means may be selected for suitably fixing or removably attaching an electronic device 28 (such as an RFID tag) to a respective asset 76. Indeed, one or more characteristics of a respective asset 76 may certainly impact the means ultimately selected for permanently or removably fixing an electronic device 28 to an asset 76.

The data communication terminal 14 of the invention is structured with yet another antenna in the form of a position determining antenna 16. The antenna 16 is included for receiving position related information from the position providing system 70, enabling a determining of a current location at which the asset 76 and data communication terminal 14 are located. For example, once the identifying code of the asset 76 has been received by the data communication terminal 14, the position determining antenna 16 may be employed by the data communication terminal 14 to receive position related information for determining a current location at which the asset and data communication terminal 14 are located. Next, among other activities, the data communication terminal 14 may be configured to transmit information by way of the wireless communication antenna 26, including the identifying code and the current location of the asset 76, to the remote computing system 90 for use thereby (as will be discussed further hereinafter).

Figure 2:
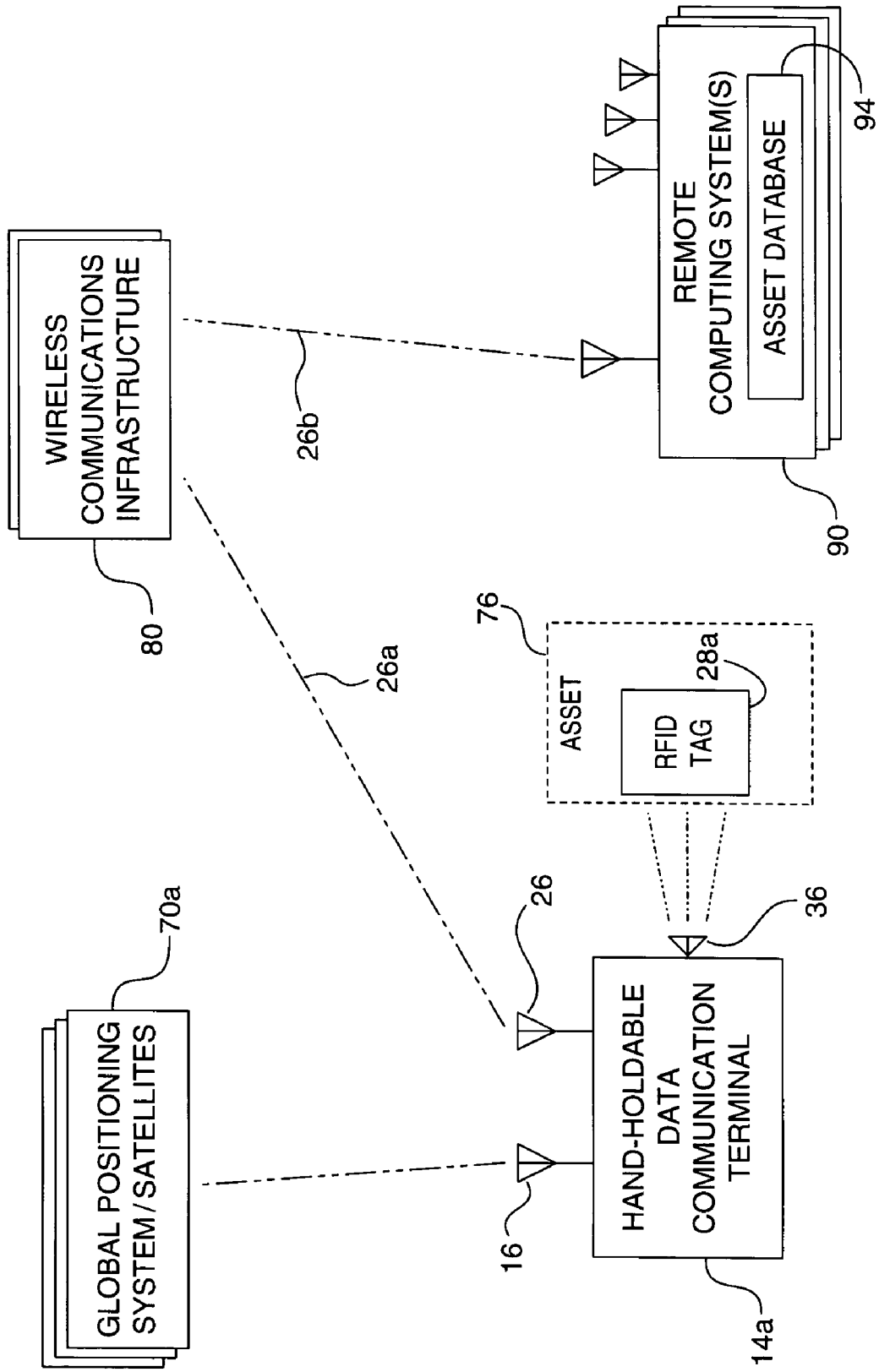
FIG. 2 is a functional block diagram of a preferred embodiment of the invention employing global position determining system (GPS) and wireless communication technologies.

Turning now to FIG. 2, a functional block diagram of a most preferred embodiment of the invention is provided. As shown, a hand-holdable version of a data communication terminal 14a is included, again structured with a plurality of antennas. The wireless communication antenna 26 functions as described hereinabove by aiding in establishing a (first) communication link 26a for communicating with the remote computing system 90 (which houses an asset database 94). It may be noted, as shown in FIG. 2, that an exchanging of information between the hand-holdable data communication terminal 14a and the remote computing system 90 may actually include the use of a wireless communications infrastructure 80 and a plurality of communication links, such as communication links 26a and 26b.

The embodiment of FIG. 2 further preferably employs RFID technology for asset identification. Accordingly, an RFID interrogator antenna 36 is included to radiate and detect the presence of a passive RFID tag 28a of an asset 76. Once the RFID tag 28a is energized by an RF signal radiated from the RFID interrogator antenna 36, a wireless transceiver that is typically also coupled to antenna 36 of the data communication terminal 14a receives the identifying code from the RFID tag 28a of a proximate asset 76 of interest.

In the preferred embodiment of FIG. 2, once the asset identifying code is received, a position determining (GPS) antenna 16, and associated modules and circuitry, are employed for receiving information from a plurality of GPS satellites 70a. The GPS position information received via the position determining antenna 16 is then processed by the hand-holdable data communication terminal 14a to determine current location information. Once the current location information is available, the hand-holdable data communication terminal 14a can be configured to transmit pertinent information to the remote computing system 90 via any suitable and available technology, such as the wireless communications infrastructure 80.

Figure 3:
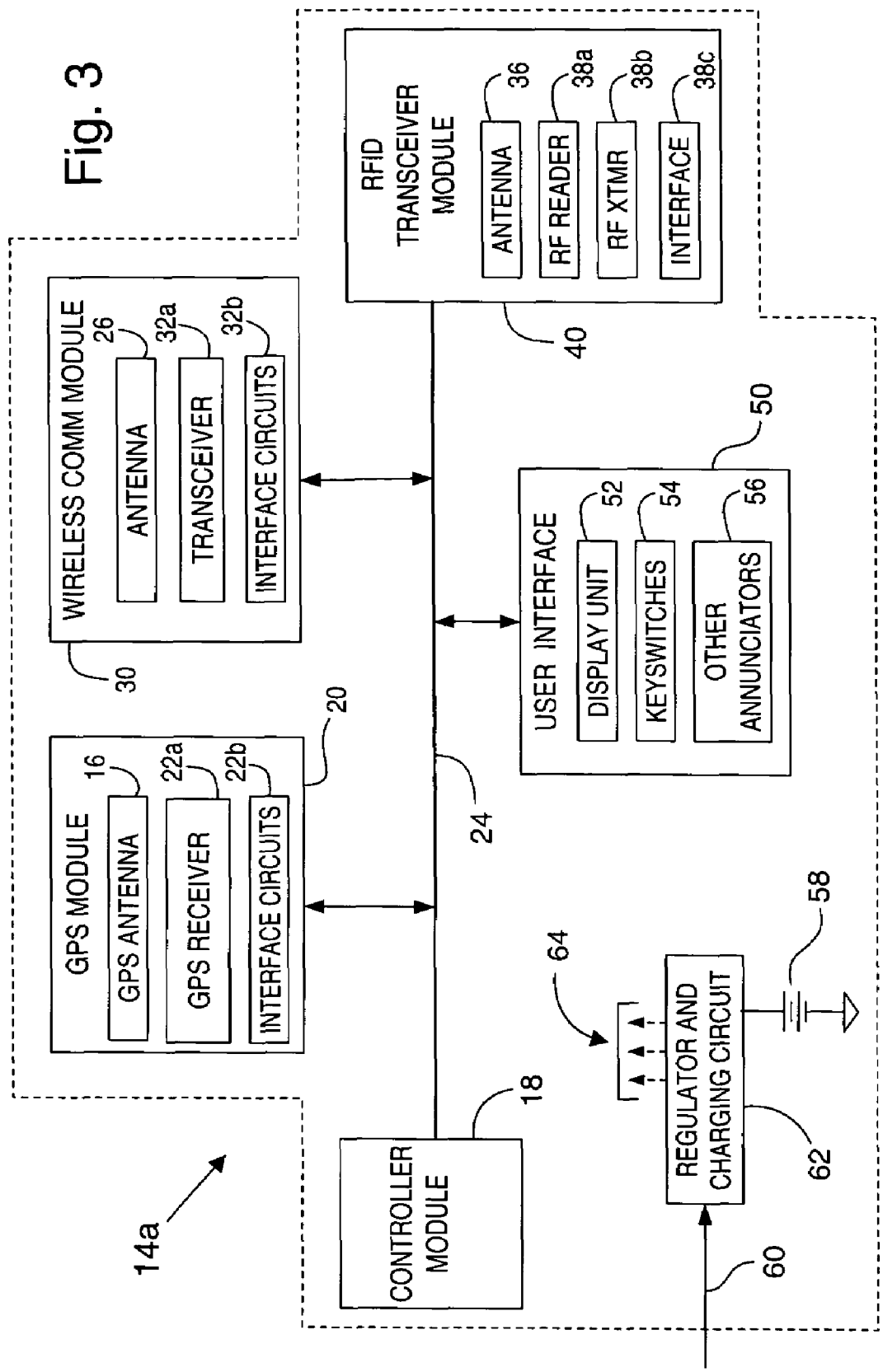
FIG. 3 is a block diagram of a preferred hand-holdable data communication terminal consistent with the embodiment of the invention illustrated in FIG. 2.

The hand-holdable data communication terminal 14a of FIG. 2 may be provided in a number of functionally equivalent structures. For example, as shown in FIG. 3 an embedded architecture, possibly utilizing a microprocessor or microcontroller, may be structured with a controller module 18 and a system bus 24. Operatively coupled to the controller module 18 via the system bus 24, or equivalently a plurality of interfaces/buses providable by skilled individuals, are a local RFID transceiver module 40, a GPS positioning module 20, and a wireless communication module 30.

The asset 76 is identified by the controller module 18 activating an RF transmitter 38b of the RFID transceiver module 40, and radiating (emitting) an RF signal from the RFID interrogator antenna 36. Once the RF signal is detected by a proximate electronic device of an asset 76, a response from the electronic device 28 is received by an RF reader 38a. The RFID transceiver module 40 then notifies the controller module 18, via interface 38c and system bus 24, and a reading of the identifying code from the RFID transceiver module 40 is effected by the controller module 18. It should be noted that the RF reader 38a and the RF transmitter 38b may be referred to as an 'RFID interrogator'.

Upon a receiving of an identifying code, or on a periodic or continuous basis, the GPS module 20 may be activated by the controller module 18 for receiving and processing position related information, preferably from a plurality of GPS satellites 70a. For example, in the present hand-holdable embodiment of the data communication terminal 14a, which is contemplated as being battery powered, it may be desirable to only activate the GPS module 20 after a receiving of an identifying code of an asset 76. This approach enables power consumed by the GPS module 20 to be minimized.

As shown in FIG. 3, the GPS module 20 depicted may include the antenna 16, a GPS receiver 22a and required interface circuits 22b. Information is received by the antenna 16 and coupled to the GPS receiver 22a. The received position related information may be processed within the GPS module 20, or passed along in its received/raw form for processing by the controller module 18. Regardless of where the processing is conducted, once the received position information is processed, a current location is known and available to the controller module 18 in the form of current location information. The current location information provides the location of both the data communication terminal 14a and the asset of interest, which is located proximate to the data communication terminal.

To support the exchanging of information with the remote computing system 90 (best seen in FIGS. 1 and 2), the data communication terminal 14/14a may be embodied with a wireless communication module 30 as shown in FIG. 3, or an equivalent functional module. The wireless communication module 30 may include a transceiver 32a that is operatively coupled to the wireless communication antenna 26, along with interface circuits 32b that operatively couple the transceiver 32a to the system bus 24 and the controller module 18.

The wireless communication module 30, which may most preferably be provided by a satellite transceiver and or a cellular transceiver, may be employed for, among other tasks, any of the following:

i) transmitting to the remote computing system 90 information including the identifying code and the current location of the proximate asset of interest; and ii) receiving information from the remote computing system 90, as required, including information related to the asset identified by the identifying code originally sent to the remote computing system 90.

Figure 5:
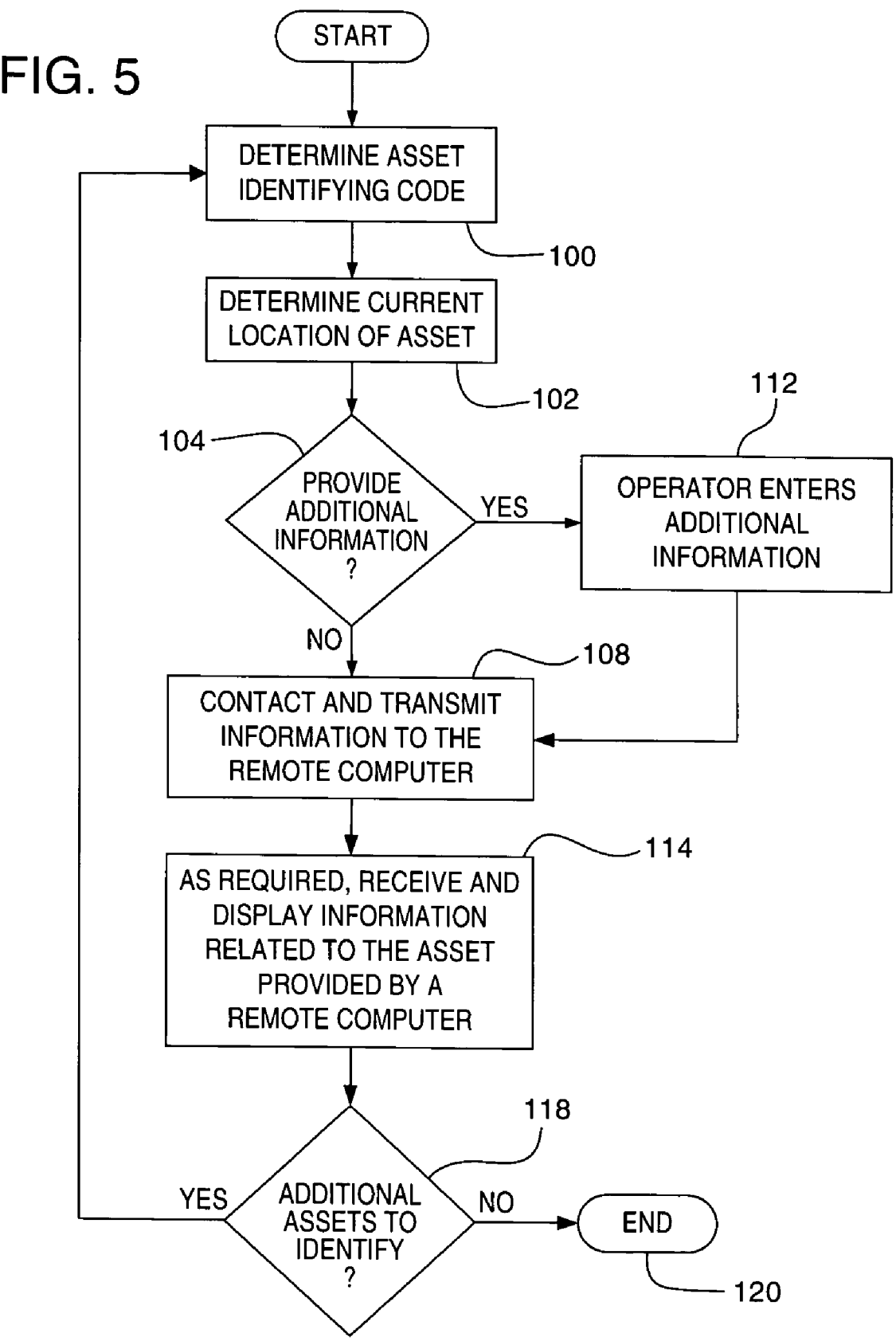
FIG. 5 depicts a simplified high level flow diagram of an operational embodiment of the invention.

Additional operational characteristics and features of the asset management and status system 10 of the invention, and the data communication terminals 14 and 14a, will be provided when referring to FIGS. 5 and 7.

Turning again to FIG. 3, a most preferred embodiment of the data communication terminals 14/14a of the present invention are structured with a user interface 50. A simple embodiment of a basic user interface may be provided by a display unit 52, a plurality of keyswitches 54, and possibly other items including annunciators 56. As understood by skilled persons, the keyswitches 54 and display unit 52 are operatively coupled to the controller module 18 for enabling a user input information (such as data and commands) and view information (including asset related information), respectively. An exemplary user interface 50 may be structured with display unit 52 provided as an LCD module, and the keyswitches 54 provided as a small footprint keypad. Further, in preferable embodiments wherein a hand-holdable data communication terminal 14a is provided, the keyswitches 54 may be arranged to support one-handed operation such that fingers of the same hand used to hold the data communication terminal 14a may be employed for activating keyswitches 54.

As understood by skilled persons, if the data communication terminal 14a of FIG. 3 is provided as a portable hand-holdable device, there must be an internal power source and associated regulation circuitry. Accordingly, the embodiment of FIG. 3 includes a regulator and charging circuit 62, with a rechargeable battery 58 coupled thereto. Periodically, an external power source 60 may be coupled to the regulator and charging circuit 62 for recharging the battery 58. As illustrated, a plurality of power outputs 64 from the regulator and charging circuit 62 may be coupled to the various modules and circuit components, as required for proper operation.

Figure 4:
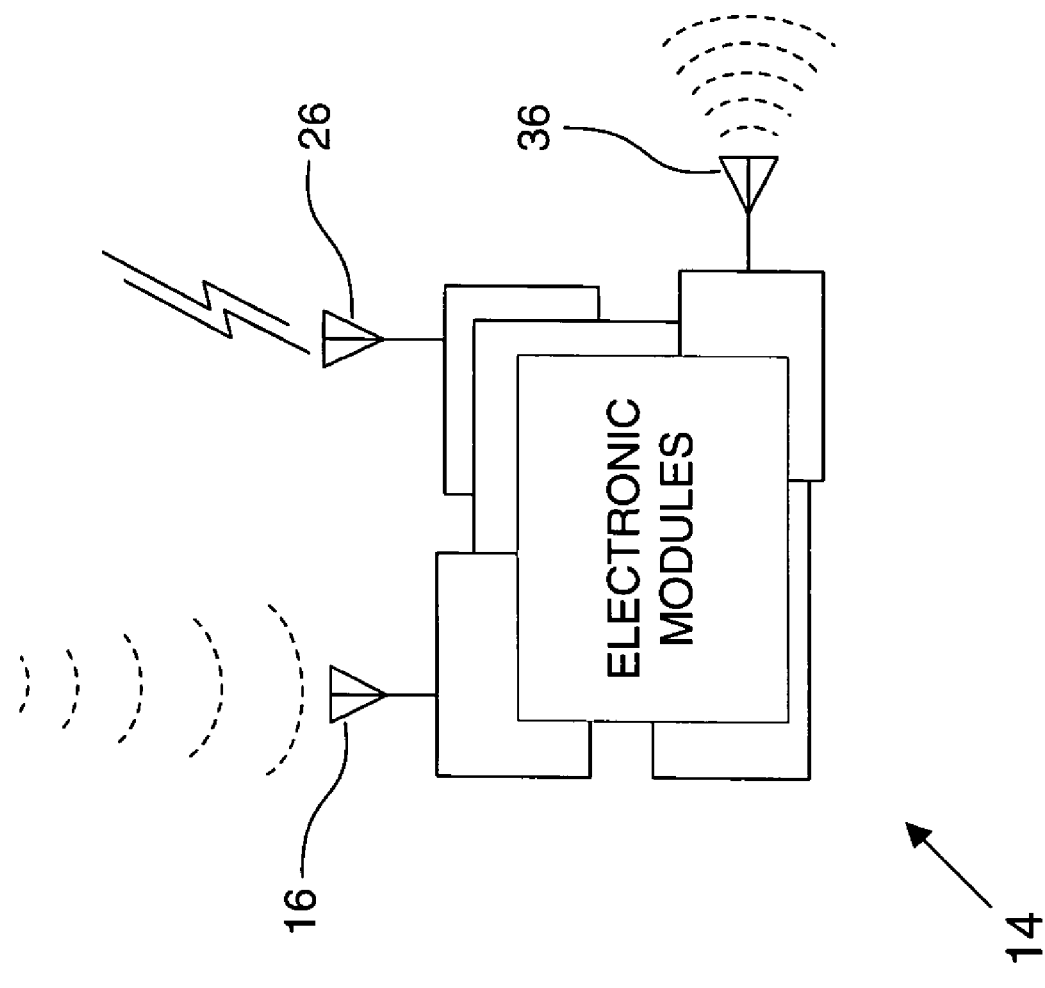
FIG. 4 depicts important aspects regarding the inclusion and placement of a plurality of antennas of the hand-holdable data communication terminal of FIG. 3.

Referring now to FIG. 4, an important aspect of the present invention is depicted in a high level block diagram. As can be seen therein, at least three antennas 16, 26, and 36 are included with the preferred embodiments of the data communication terminal 14. As understood by skilled persons, the placement of the antennas may be critical for operational considerations. For example, each antenna may be operated in a mutually exclusive manner, eliminating interference between simultaneously operated antennas. For example, when the RF signal is radiated by the RFID interrogator antenna 36, the electronic circuits driving the position determining GPS antenna 16 and or wireless communication antenna 26, may be placed in a quiescent or standby state. Additionally, antennas may be provided with differing orientations and or suitable spacing, as depicted in FIG. 4. It may also be noted that the antennas of FIG. 4 would be most preferably oriented to transmit or receive information from at least two or more axes.

Figure 6:
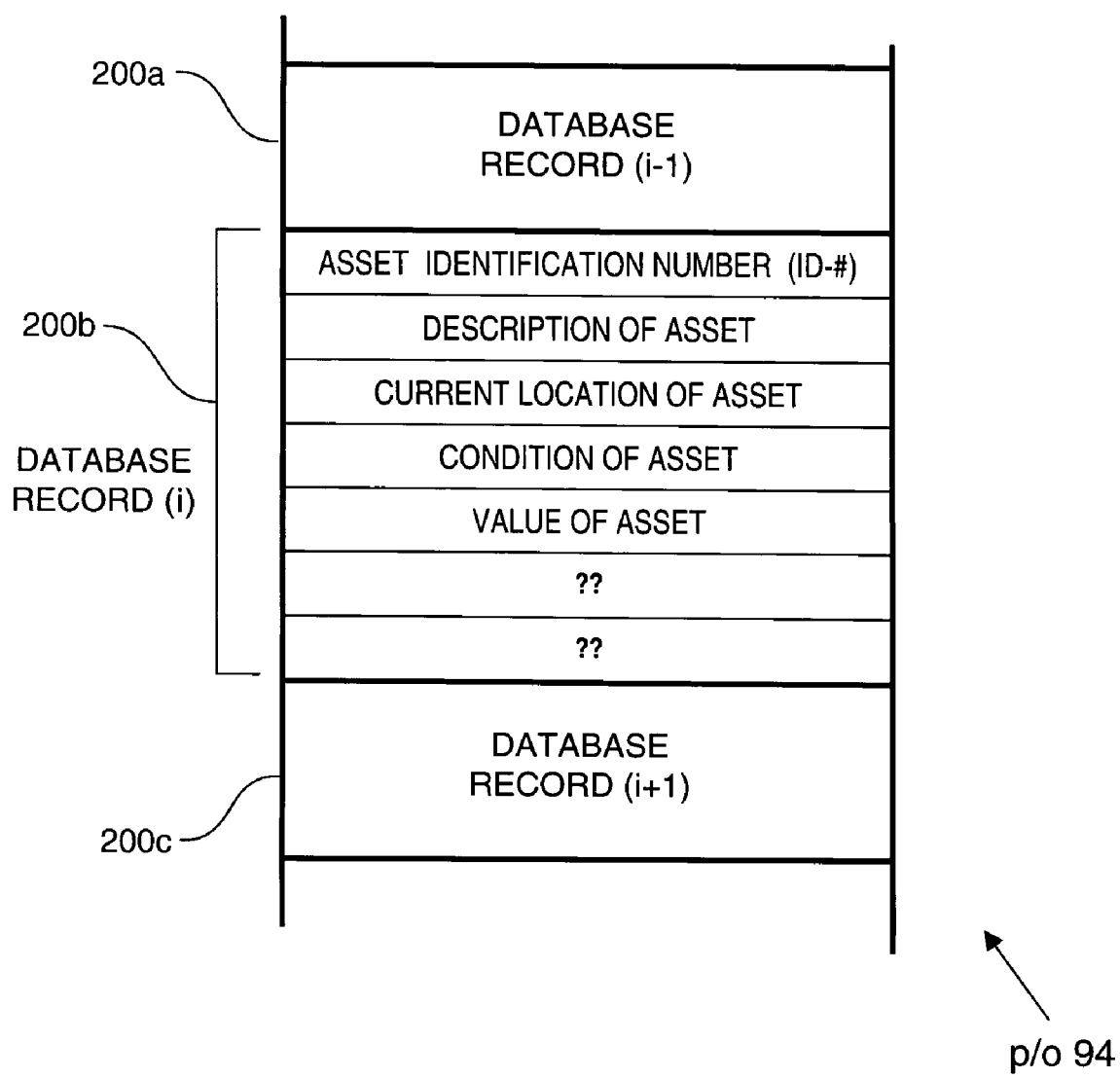
FIG. 6 provides one possible embodiment of a record of the database of the remote computing system.

Turning now to FIG. 5, there is provided therein a simplified system level operational flow diagram of an embodiment of the present invention. The method supports a monitoring of a plurality of distributed assets, and a maintaining of a database of information associated with the assets. Preferably the database 94 is established on a remote and wirelessly accessible computing system 90, with each asset having associated therewith at least one data record 200. For example, as depicted in FIG. 6, a plurality of records, including data records 200a, 200b, and 200c, which may be generically termed records 200, may be established and stored within a portion of (p/o) the database 94. As illustrated in FIG. 6, a record may contain a number of pieces of information or elements, possibly including:

a) an asset identifying code;

b) an asset description;

c) the current location of the asset;

d) the condition of the asset (e.g., fully operational, being repaired, damaged, etc.);

e) the value of the asset;

f) date of purchase or enlistment; and g) other possible fields.

It is to be understood that the actual plurality of fields or elements provided by a respective record 200 of the database 94 may be determined by the actual nature of an asset, as well as numerous other factors. Accordingly, the record depicted in FIG. 6 is one of many possible embodiments that are employable with the present invention. In addition, records may be structured such that different records hold different information, for example, as a function of a respective asset. Finally, a determining of information such as current location, present condition, time until repaired and available, etc., may be termed 'status determining activities'.

Returning to FIG. 5, the method may commence with a determining of an identifying code of an asset at 100. As an example, considering the operation of the asset management and status system of FIG. 2, the identifying code of the asset may be determined by radiating an RF signal from the RFID antenna 36. Upon detection by a proximate RFID tag 28a, a receiving of information including an identifying code would most preferably follow with minimal delay. Next, at 102, a determining of the current location may be effected. If at 104, it is determined that additional operator information is to be input, say via a keypad, at 112 a user/operator inputs the additional information. This may be realized by using one or more input devices including key-switches, a touch screen, voice recognition technology, etc. At 108, a communication link is established (if not already established) and the identifying code and the current location of the asset are transmitted to the remote computing system 90.

It may be assumed that upon receiving the information from the data communication terminal, the database 94 is accessed and, preferably updated. For example, the current location of the asset may be updated and stored for future access, say along with a time stamp. Accordingly, it is contemplated that the information contained within the records of the database will be regularly updated, and available to authorized individuals to determine a variety of asset related information, including status information. Status information may be any of a variety of pieces of information, including the location, operational condition, current user, etc., of an asset of interest. Further, such status information may be employed for controlling, deploying, and generally maximizing the use of one or more assets.

Returning to FIG. 5, once the information has been transmitted to the remote computing system at 108, updated and or accessible information from one or more asset records may be, at least in part, transmitted back to the data communication terminal and displayed. That is, in response to the receiving of information from the data communication terminal, the remote computing system may preferably access and update at least one asset record, and subsequently may transmit back a portion of the accessed record(s), to the data communication terminal from which the identifying code was originally transmitted. This information, as required, may be displayed for viewing by a user of the data communication terminal.

Referring now to FIG. 7, provided therein is a high level operational flow diagram for an embodiment of the data communication terminal 14/14a of the invention. It is to be understood, that FIG. 7 includes only a selected portion of the functionality that may be provided by embodiments of the data communication terminal, and at a high level. At power-up or reset, the operation of the data communication terminal may be provided at 300, with the terminal performing power-on self tests (POSTs) at 302. Once the POSTs have been completed, the data communication terminal may preferably enter a low-power standby state 304. A transition from the standby state 304 to an active state, such as at 306 may most preferably be initiated by an event, such as a depression of a key-switch by the user. At 306, an RF signal is generated and radiated. If an electronic device (of an asset) is not detected, say within a predetermined temporal interval, a time-out mechanism may be included to return the data communication terminal to a desired state. For example, as shown in FIG. 7, a loop of radiating at 306, checking for a response from an electronic device at 312, and a checking for a time-out at 308, may be repeated for a pre-selected period of time (or equivalently, a pre-determined number of iterations). If a time-out is reached at 308, via the yes branch, the data communication terminal may be placed back into the standby mode at 304. In addition, an indication that the detecting of an electronic device (e.g., RFID tag) failed could be provided to the user.

If at 312, it is determined that an electronic device was detected, at 314 there is a receiving and processing of a return signal (from the electronic device), which at minimum, provides the asset' identifying code to the data communication terminal. Next, if not already in progress, the current location is determined at 318. At 324 a check is made to determine if the user is to provide information. If so, at 328 the user inputs the information. At 320, the asset related information is transmitted to a remote computing system, or alternately exchanged with the remote computing system. If information, possibly from the remote computing system, is to be displayed for viewing by the user, at 332 the information may be placed on a display. Next, in the simplified operational diagram of FIG. 7, the data communication terminal may transition back into the standby mode.

As skilled persons will appreciate, the operational description of FIG. 7 is but one of many that may be employed with a data communication terminal of the present invention. For example, if the user activates a key-switch while in the standby mode at 304, it may be possible to provide a paralleling of the tasks of 306 (radiating the RF signal), and 318 (determining a current location). Importantly, if the antennas employed with the data communication terminal are provided and oriented as depicted in FIG. 4 and discussed hereinabove, the tasks of attempting to detect a nearby electronic device of an asset and receiving position determining information may not interfere with each other. In yet another embodiment, once the identifying code of the asset is received, the user may be prompted to input any necessary information, while at the same time the current location information is being determined. Subsequently, the user may be again prompted to authorize the transmitting of the identifying code and the current location to the remote computing system. As such, with these modified embodiments of the data communication terminal 14 of the invention, user actions may be required for transmitting information to the remote computing system.

Accordingly, while there have been described herein a plurality of the currently preferred embodiments of the present invention, along with contemplated methods of operation and use, those skilled in the art will recognize that other and further modifications may be made without departing from the invention. As such, the foregoing descriptions of the specific embodiments of the present invention have been presented for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. An asset management and status system comprising:
   a) a remote computing system configured with a wireless communication capability enabling, at minimum, an exchanging of information with any of a plurality of wireless data communication terminals, each data communication terminal available for use by an individual for identifying assets, by receiving directly from a proximate asset of interest, a unique identifying code in order to aid in asset management and status determining activities;
   b) a database established and maintained on the remote computing system, and available for storing and retrieving information associated with any of a plurality of the assets being managed by the asset management and status system; and
   c) the plurality of wireless data communication terminals, with each data communication terminal structured having an equivalent of at least three communication modules supporting:
      i) establishing a local, short distance, wireless communication link with a proximate wireless electronic device fixed to a proximate asset of interest, such that the communication link enables a receiving by the data communication terminal of information transmitted directly from the electronic device of the asset, with the information including the unique identifying code assigned to the asset;
      ii) receiving and processing position related information for determining a current location at which the data communication terminal, and thereby the proximate asset, are located;
      iii) exchanging information with the remote computing system, including transmitting to the remote computing system the received identifying code and the current location of the data communication terminal and the asset, for use in accessing and updating the database established on the remote computing system.

2. The asset management and status system as recited in claim 1, wherein the data communication terminal is a hand-holdable device, comprising:
   a) a user interface structured with an information display and a plurality of keyswitches, with the display viewable by a user and keyswitches available to the user for entering command and data information;
   b) a controller for controlling the operation of the wireless data communication terminal, with the user interface and keyswitches operatively coupled to the controller;
   c) a plurality of communication modules including a position determining module, a local wireless transceiver module, and a wireless communication module;
   d) with each communication module operatively coupled to the controller such that:
      i) the position determining module is available to the controller for receiving position related information and determining current location information indicating a current location of the data communication terminal and proximate items;
      ii) the local wireless transceiver module responsive to the controller such that when activated thereby, in the presence of the electronic device, an identifying code at minimum is received directly from the electronic device of a proximate asset, and available to the controller; and
      iii) the wireless communication module structured for exchanging information, including asset related information, with the remote computing system.

3. The asset management and status system as recited in claim 2, wherein upon receiving information including the identifying code from the electronic device, the controller is configured for activating the position determining module, determining a current location, and transmitting the identifying code and the current location information by way of the wireless communication module to the remote computing system.

4. The asset management and status system as recited in claim 3, with the data communication terminal configured so that the user is prompted to authorize the transmitting of the identifying code and the current location information to the remote computing system.

5. The asset management and status system as recited in claim 3, wherein upon receiving the information from the data communication terminal, including the identifying code and the current location information, the remote computing system accesses the database and updates information stored in at least one record associated with the asset identified by the received identifying code.

6. The asset management and status system as recited in claim 5, wherein subsequently to accessing at least a portion of a record associated with the asset identified by the identifying code, asset related information is transmitted back to the data communication terminal from which the identifying code originated.

7. The asset management and status system as recited in claim 6, wherein asset related information that is transmitted back to the data communication terminal is, at least in part, displayed for user viewing upon the display.

8. The asset management and status system as recited in claim 2, wherein the data communication terminal is structured such that each of the following is supported:
   a) the user interface is employable by a user for inputting information related to the proximate asset whose identifying code has been directly received from the electronic device via the local wireless transceiver module; and
   b) at least a portion of the information entered in step-a is transmitted to the remote computing system for storing in the database.

9. The asset management and status system as recited in claim 1, wherein the electronic device that is fixed to the proximate asset is provided by at least one of:
   a) a passive RFID tag;
   b) an active RFID transponder; and
   c) a portable computing and communication device.

10. A distributed asset management and status system enabling a plurality of distributed assets to be inventoried, managed, and tracked such that a database, containing at least one record for each asset, can be established, maintained and updated, with records being available for remote accessing each time an asset is identified, the asset management and status system comprising:
    a) a plurality of data communication terminals structured with a user interface and a multi-function communications capability, the data communication terminal configured for:
       i) directly establishing a communication link with at least one proximate electronic device of an asset for exchanging information directly therewith, including a receiving by the data communication terminal of information including a unique identifying code transmitted by a respective proximate electronic device of the asset;
ii) receiving and processing position information enabling a determining of a current location at which the data communication terminal, and thereby the proximate asset, are located; and
iii) transmitting information, including at least the identifying code and the associated current location information to a remote computing system;

b) the remote computing system, providing access to the database housing the asset related information in the form of at least one record for each asset, with the database established, maintained and updated, for accessing by a user utilizing one of the wireless data communication terminals for gaining access to information related to one or more assets of interest;

c) a plurality of the electronic devices, with each electronic device associated with an asset by being fixed thereto by way of a selected means, each electronic device configured having a unique and readable identifying code; and d) means for enabling the exchanging of information between the data communication terminal and each of:
i) the electronic device;
ii) a position determining system; and
iii) the remote computing system.

11. The asset management and status system as recited in claim 10, wherein each electronic device is provided by at least one of:
a) a passive RFID tag;
b) an active RFID transponder; and
c) a portable computing and communication device.

12. The asset management and status system as recited in claim 10, wherein information is also transmitted from the data communication terminal to the electronic device for storage thereby.

13. The asset management and status system as recited in claim 12, wherein the information transmitted to the electronic device, at least in part, originated from the remote computing system, and passes through the data communication terminal.

14. A method of monitoring a plurality of distributed assets and maintaining a database of information associated with the assets, with each asset equipped with an electronic identification device having a unique identifying code contained therein, the method comprising the steps of:
a) radiating an RF signal from a wireless data communication terminal, for detection by a proximate wireless electronic identification device of an asset in order to determine a unique identifying code of the asset;
b) receiving information by way of the wireless data communication terminal directly from the electronic identification device of the asset that was radiated by the RF signal originating from the data communication terminal, with the information including at minimum the unique identifying code of the asset;
c) receiving position related information by way of the data communication terminal from an external source;
d) processing the received position related information for determining a current location; and
e) transmitting information from the data communication terminal, with the information including the unique identifying code of the asset and the determined current location at which the data communication terminal, and thereby the proximate asset of interest are each located, with the information transmitted to a remote computing system for use in accessing and updating at least one record of the database containing information, including asset related information.

15. The method as recited in claim 14, wherein after the transmitting step, additional steps include:
a) using the information received by the remote computing system, including the identifying code, and accessing at least one record of the database associated with the asset identified by the identifying code; and
b) updating location information thereby updating the current location of the asset that is stored within the record accessed.

16. The method as recited in claim 15, wherein an additional step is included of transmitting at least a portion of the accessed record back to a data communication terminal from which the identifying code was originally transmitted.

* * * * *